(12) United States Patent
Buckley et al.

(10) Patent No.: US 8,060,084 B2
(45) Date of Patent: Nov. 15, 2011

(54) NETWORK SELECTION SCHEME USING A ROAMING BROKER (RB)

(75) Inventors: Adrian Buckley, Tracy, CA (US); Paul Carpenter, St. Margarets (GB); Nicholas P. Alfano, Stratford-Upon-Avon (GB); Andrew Allen, Mundelein, IL (US)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/116,461

(22) Filed: Apr. 28, 2005

(65) Prior Publication Data
US 2006/0245392 A1    Nov. 2, 2006

(51) Int. Cl.
*H04W 4/00* (2009.01)
(52) U.S. Cl. ......... 455/432.1; 455/422.1; 455/426.2; 455/432.2; 455/434; 455/435.1; 455/435.2; 455/436; 370/310.2; 370/322; 370/328
(58) Field of Classification Search .......... 455/426.2, 455/422.1, 432.1, 432.2, 434, 435.1, 435.2, 455/436; 370/310.2, 322, 328
See application file for complete search history.

(56) References Cited

U.S. PATENT DOCUMENTS

| | | | |
|---|---|---|---|
| 5,027,388 A | 6/1991 | Bradshaw | |
| 5,420,914 A | 5/1995 | Blumhardt | |
| 5,594,949 A * | 1/1997 | Andersson et al. | 455/437 |
| 5,623,535 A * | 4/1997 | Leung et al. | 455/444 |
| 5,659,601 A | 8/1997 | Cheslog | |
| 5,701,585 A * | 12/1997 | Kallin et al. | 455/437 |
| 5,862,480 A * | 1/1999 | Wild et al. | 455/432.2 |
| 5,953,665 A * | 9/1999 | Mattila | 455/434 |
| 6,044,141 A * | 3/2000 | Ho et al. | 379/221.15 |
| 6,044,249 A * | 3/2000 | Chandra et al. | 455/62 |
| 6,167,250 A | 12/2000 | Rahman | |
| 6,285,868 B1 * | 9/2001 | LaDue | 455/410 |
| 6,347,091 B1 * | 2/2002 | Wallentin et al. | 370/437 |
| 6,349,099 B1 * | 2/2002 | Larikka et al. | 370/395.1 |
| 6,360,097 B1 * | 3/2002 | Smith et al. | 455/434 |
| 6,385,454 B1 * | 5/2002 | Bahl et al. | 455/450 |
| 6,385,460 B1 | 5/2002 | Wan | |
| 6,405,038 B1 | 6/2002 | Barber | |
| 6,477,372 B1 * | 11/2002 | Otting et al. | 455/434 |
| 6,501,951 B2 * | 12/2002 | Moore | 455/434 |
| 6,522,735 B1 | 2/2003 | Fortman | |
| 6,608,832 B2 * | 8/2003 | Forslow | 370/353 |
| 6,611,516 B1 * | 8/2003 | Pirkola et al. | 370/352 |

(Continued)

FOREIGN PATENT DOCUMENTS

CA    1270742    10/2000

(Continued)

OTHER PUBLICATIONS

European Search Report; European Patent Office; Sep. 2, 2005; 5 pages.

(Continued)

*Primary Examiner* — Steve D Agosta
(74) *Attorney, Agent, or Firm* — Danamraj Law Group, P.C.

(57) ABSTRACT

A network selection scheme operable in a network environment having one or more radio access networks (RANs), one or more core networks (CNs), and one or more service networks (SNs). Upon obtaining identity information of a particular network combination, a wireless user equipment (UE) device is operable to register with a roaming broker (RB), whereby additional information may be provided to the device for facilitating appropriate network selection.

18 Claims, 12 Drawing Sheets

U.S. PATENT DOCUMENTS

| | | |
|---|---|---|
| 6,625,451 B1 | 9/2003 | La Medica |
| 6,690,929 B1 | 2/2004 | Yeh |
| 6,728,267 B1 | 4/2004 | Giese |
| 6,741,848 B2 | 5/2004 | Timonen |
| 6,769,000 B1 | 7/2004 | Akhtar |
| 6,795,708 B1 | 9/2004 | Patel |
| 6,901,257 B2 * | 5/2005 | Kubota ................... 455/439 |
| 6,950,655 B2 * | 9/2005 | Hunkeler ............... 455/426.1 |
| 6,985,733 B2 * | 1/2006 | Binzel ..................... 455/437 |
| 7,079,499 B1 | 7/2006 | Akhtar |
| 7,151,938 B2 * | 12/2006 | Weigand ............... 455/452.1 |
| 7,209,709 B2 | 4/2007 | Miyazaki |
| 2002/0101858 A1 | 8/2002 | Stuart |
| 2002/0119774 A1 * | 8/2002 | Johannesson et al. ........ 455/434 |
| 2002/0178118 A1 | 11/2002 | Hamilton |
| 2003/0017828 A1 | 1/2003 | Kotzin |
| 2003/0120541 A1 | 6/2003 | Siann |
| 2003/0142641 A1 * | 7/2003 | Sumner et al. ............. 370/328 |
| 2004/0110523 A1 * | 6/2004 | Ishii ..................... 455/517 |
| 2006/0246889 A1 | 11/2006 | Buchhop et al. |
| 2008/0032736 A1 | 2/2008 | Bari |
| 2009/0222566 A1 | 9/2009 | Murakami |

FOREIGN PATENT DOCUMENTS

| | | | |
|---|---|---|---|
| CN | 1430840 | | 7/2003 |
| EP | 1213941 | | 6/2002 |
| EP | 1104975 | | 7/2004 |
| GB | 2352586 | | 1/2001 |
| WO | 200414862 | | 7/2000 |
| WO | 0105174 | | 1/2001 |
| WO | 03096578 | | 11/2003 |
| WO | WO-2004/047476 | * | 6/2004 |
| WO | WO 2004/047476 A1 | | 6/2004 |
| WO | WO 2005/002140 A1 | | 1/2005 |
| WO | 2005027557 | | 3/2005 |

OTHER PUBLICATIONS

European Search Report in EP Application No. 05252665.4; European Patent Office; Sep. 13, 2005; 6 pages.
European Search Report in EP Application No. 07120521.5; European Patent Office; Dec. 19, 2007; 4 pages.
European Examination Report Application No. 05252665.4; European Patent Office; Mar. 30, 2006; 3 pages.
European Examination Report Application No. 07120521.5; European Patent Office; Aug. 6, 2008; 2 pages.
EPO Search Report in EP Application No. 09151437.2; European Patent Office; Apr. 8, 2009; 5 pages.
Canadian Office Action; Application No. 2,545,035; Canadian Intellectual Property Office; Feb. 26, 2010, 4 pages.
Chinese Office Action; Application No. 200610077263.8; State Intellectual Property Office of People's Republic of China; Mar. 2, 2010; 3 pgs.
AU Examination Request, Application No. 2006201729, Australian IPO, Jan. 6, 2010, 2 pgs.
AU Examination Request, Application No. 2006201730, Australian IPO, Nov. 10, 2009, 4 pgs.
CA Office Action, Application No. 2545032, Canadian IPO, Oct. 21, 2008, 2 pgs.
CN Office Action, Application No. 200610072642, Chinese IPO, Dec. 24, 2010, 9 pgs.
EP Examination Report, Application No. 05252666.2, European Patent Office, Apr. 21, 2008, 5 pgs.
EP Examination Report, Application No. 07120521.5, European patent Office, Apr. 7, 2009, 4 pgs.
3GPP, TR 31.905, V 4.4.0, 3rd Generation Partnership Project; Technical Specification Group Services and System Aspects; Vocabulary for 3GPP Specifications (Release 4), Oct. 2001, 48 pgs.
TW Office Action, Application No. 095115179, Taiwanese IPO, Mar. 10, 2011, 2 pgs.
TW Office Action, Application No. 095115180, Taiwanese IPO, Feb. 25, 2011, 2 pgs.
TW Search Report, Application No. 095115179, Taiwanese IPO, Feb. 1, 2011, 1 pg.
TW Search Report, Application No. 095115180, Taiwanese IPO, Feb. 22, 2011, 1 pgs.
US Office Action, U.S. Appl. No. 11/116,470, USPTO, Apr. 15, 2008, 12 pgs.
US Office Action, U.S. Appl. No. 11/116,470, USPTO, Oct. 17, 2008, 11 pgs.
US Office Action, U.S. Appl. No. 11/116,470, USPTO, Mar. 5, 2009, 6 pgs.
US Office Action, U.S. Appl. No. 11/116,470, USPTO, Aug. 12, 2009, 6 pgs.
US Office Action, U.S. Appl. No. 11/116,470, USPTO, Jan. 28, 2010, 8 pgs.
US Office Action, U.S. Appl. No. 11/116,470, USPTO, Mar. 28, 2011, 6 pgs.
Chinese Office Action; Application No. 200610077263.8; State Intellectual Property Office of People's Republic of China; Aug. 11, 2010; 4 pgs.
Canadian Office Action; Application No. 2,545,032; Canadian Intellectual Property Office; Jul. 15, 2010; 3 pgs.
CIPO, Office Action, Application No. 2,545,035, Jul. 11, 2011, 2 pgs.
JPO, Office Action, Application No. 2006-122719, Jun. 9, 2011, 4 pgs.
JPO, Office Action, Application No. 2006-122735, Jun. 9, 2011, 3 pgs.

* cited by examiner

| RAN 302 | Services supported by RAN 304 | Other RANs supported by selected RAN 306 | Core Networks supported by RAN 308 | Services supported by each CN 310 |
|---|---|---|---|---|
| RAN-1 | HSDPA<br>EDGE<br>. . . | RAN-X<br>RAN-Z<br>RAN-Y<br>.<br>WLAN-A<br>WLAN-B | CN-1<br>CN-2<br>CN-3<br>. . . | IMS<br>Presence<br>PoC<br>. . . |
| RAN-2 | EDGE<br>. . . | RAN-Z<br>WLAN-C<br>WLAN-D<br>. . . | CN-4<br>CN-5<br>. . . | IMS<br>. . . |
| . . . | | | | |

*FIG. 3*

| Radio Access Technology A e.g. EDGE | | Radio Access Technology B e.g. WLAN | | Radio Access Technology C e.g. UMTS | |
|---|---|---|---|---|---|
| RAN ID 704A | Core Network ID 706A | RAN ID 704B | Core Network ID 706B | RAN ID 704C | Core Network ID 706C |
| IDa | CN-IDo CN-IDx | IDk | CN-IDx | IDc | CN-IDp |
| IDc | CN-IDp | IDa | CN-IDo CN-IDx | | |
| IDh | CN-IDq | IDd | | | |
| IDb | | IDb | | | |

*FIG. 7*

|  | MCC 802A | MNC 802B |
|---|---|---|
| 804 | ABC | XYZ |
| 806 | ABC | GHI |
| 808 | DEF | XYZ |
|  | . . . | . . . |

FIG. 8A

| MASTER [MCC, MNC] 820 | | NETWORK NAME 822 | HOME NETWORKS FOR MASTER [MCC, MNC] 824 | UNIQUE ID INDICIUM 825 |
|---|---|---|---|---|
| MCC | MNC | | | |
| ABC | XYZ | ALPHA-CELLULAR | [MCCa, MNCa]<br>[MCCb, MNCb]<br>[MCCc, MNCc] | AC-1<br>AC-2<br>AC-3 |
| DEF | XYZ | BETA-CELLULAR | [MCCg, MNCg]<br>[MCCh, MNCh] | BC-1<br>BC-2 |
| . | . | . | . | . |

FIG. 8B

| Network with direct relationship to Home network (i.e., Visited networks that provide roaming services to Home network) ~902 | Access Networks with relationships to Visited networks (RANs having relationships to the Core Visited networks identified) ~904 | Status of Network with direct relationship to Home network (e.g., service status flag) ~906 | Services supported on Network with direct relationship to Home network ~908 |
|---|---|---|---|
| MCNCa.MSNCa | MCCd.MANCb | ON | IMS |
|  | MCCd.MANCc | OFF | GPRS |
|  | . . . | . . . | . . . |
| MCNCa.MSNCb |  |  |  |
| MCNCa.MSNCc |  |  |  |
| MCCb.MANCc | None |  | WLAN IP access |
| MCCd.MANCa |  |  | . . . |

NETWORK SELECTION SCHEME USING A ROAMING BROKER (RB)

CROSS-REFERENCE TO RELATED APPLICATION(S)

This application discloses subject matter related to the subject matter disclosed in the following commonly owned co-pending U.S. patent application(s): "SYSTEM AND METHOD FOR PROVIDING NETWORK ADVERTISEMENT INFORMATION VIA A NETWORK ADVERTISEMENT BROKER (NAB)," filed Apr. 28, 2005 herewith, in the name(s) of: Adrian Buckley, Paul Carpenter, Nicholas P. Alfano, and Andrew Allen Ser. No. 11/116,470; each of which is hereby incorporated by reference in their entirety.

FIELD OF THE DISCLOSURE

The present patent disclosure generally relates to communication networks. More particularly, and not by way of any limitation, the present patent application is directed to a network selection scheme using a brokering entity such as a roaming broker (RB).

BACKGROUND

When a wireless network is deployed, there is a need to broadcast an identifier such that a wireless user equipment (UE) device wishing to obtain service can identify the wireless network. In a typical implementation, a single broadcast identifier is provided. However, where the constituent radio access network (RAN), core network (CN) and service network (SN) are segmented and individually identified, such a technique becomes woefully inadequate.

BRIEF DESCRIPTION OF THE DRAWINGS

A more complete understanding of the embodiments of the present patent application may be had by reference to the following Detailed Description when taken in conjunction with the accompanying drawings wherein:

FIG. 3 depicts an exemplary database structure provided as part of a network advertisement broker (NAB) in accordance with the teachings of the present patent disclosure;

FIG. 7 depicts an exemplary database structure that may be provided as an operated-based list, a user-based list or an enterprise-based list for configurably setting network selection preferences and prohibitions according to the teachings of the present patent disclosure;

FIGS. 8A and 8B depict exemplary database structures for facilitating network selection by a wireless UE device;

FIG. 9 depicts an exemplary database structure provided as part of a roaming broker (RB) node in accordance with the teachings of the present patent disclosure;

DETAILED DESCRIPTION OF THE DRAWINGS

Figure 1:
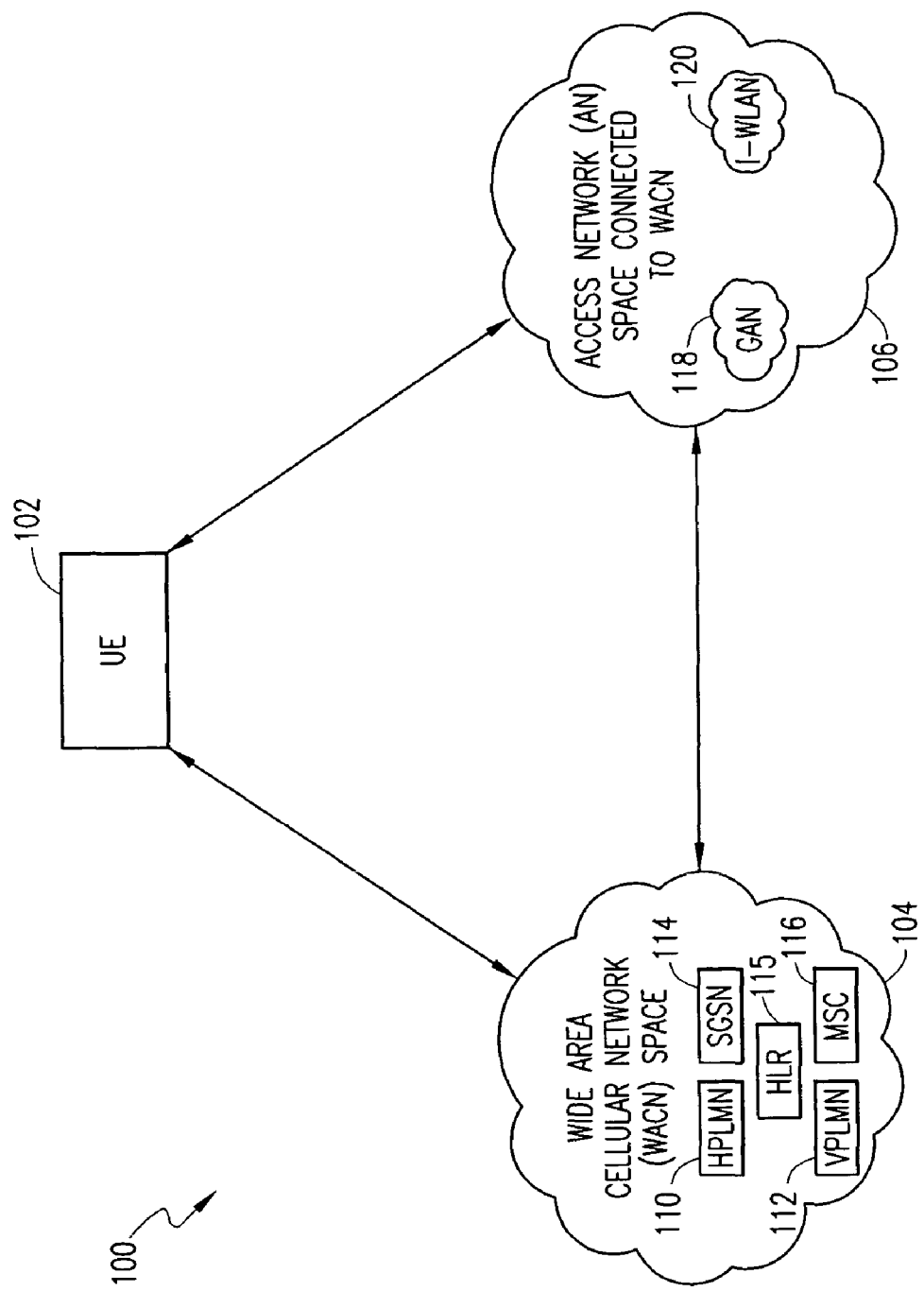
FIG. 1 depicts a generalized network environment wherein an embodiment of the present patent disclosure may be practiced.

A network selection scheme is provided for operation in a network environment having one or more radio access networks (RANs), one or more core networks (CNs), and one or more service networks (SNs). Upon obtaining identity information of a particular network combination, a wireless user equipment (UE) device is operable to register with a roaming broker (RB), whereby additional information may be provided to the device for facilitating appropriate network selection.

In one embodiment, the present disclosure is directed to a network selection method operable in a network environment having one or more RANs, one or more CNs, and one or more SNs, comprising: obtaining identity information of a particular network combination by a wireless UE device; obtaining an Internet Protocol (IP) address of a roaming broker (RB) by the wireless UE device; transmitting network advertisement information to the RB by the wireless UE device upon registration therewith; determining by the RB if an additional network combination is more suitable to the wireless UE device; responsive to the determining, providing a redirect message to the wireless UE device, the redirect message including identity information of the additional network combination; and selecting one of the particular network combination and the additional network combination for obtaining service by the wireless UE device.

In another embodiment, the present disclosure is directed to a network selection system operable in a network environment having one or more RANs, one or more CNs, and one or more SNs, comprising: means associated with a wireless UE device for obtaining identity information of a particular network combination and for obtaining an IP address of a roaming broker (RB) disposed in the network environment; means for transmitting network advertisement information to the RB by the wireless UE device upon registration therewith; means associated with the RB for determining if an additional network combination is more suitable to the wireless UE device; means, operable responsive to the determining, for providing a redirect message to the wireless UE device, the redirect message including identity information of the additional network combination; and means associated with the wireless UE device for selecting one of the particular network combination and the additional network combination for obtaining service by the wireless UE device.

In a still further embodiment, the present disclosure is directed to a wireless UE device, comprising: a logic module operable to obtain identity information of a particular network combination available in a location area; a logic module operable to transmit network advertisement information to a roaming broker (RB) disposed in the network environment upon registration therewith; and a logic module operable to select one of the particular network combination and an additional network combination provided by the RB via a redirect message, wherein the RB includes service logic for determining if the additional network combination is more suitable to the wireless UE device, the redirect message including identity information of the additional network combination.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein an embodiment of the present patent disclosure may be practiced. A user equipment (UE) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands. For example, UE device 102 may operate in the cellular telephony band frequencies as well as Wireless Local Area Network (WLAN) bands. Further, other bands in which the UE device could operate wirelessly may comprise Wi-Max bands or one or more satellite bands. By way of illustration, the network environment 100 is envisioned as two broad categories of communication spaces capable of providing service to UE device 102 wherein acquisition of network advertisement information may be accomplished in accordance with the teachings set forth herein. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any $3^{rd}$ Generation Partnership Project (3GPP)-compliant network (e.g., 3GPP or 3GPP2), all operating with well known frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard.

In one embodiment, interfacing between the WACN and AN spaces may be effectuated in accordance with certain standards. For instance, GAN 118 may be interfaced with one or more PLMNs using the procedures set forth in the 3GPP TR 43.901 and 3GPP TS 43.xxx documents as well as related documentation. Likewise, WLAN 120 may be interfaced with at least one PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Based on the foregoing, it should be recognized that the service infrastructure of the network environment 100 may be generalized into three broad segments: one or more radio access network (RANs) (which can include cellular band technologies as well as WLAN technologies), one or more core networks (CNs), and one or more service network (SNs). Depending on network ownership arrangements and service-level agreements, each RAN may support one or more CNs, each of which in turn may support one or more SNs. Such combinations of infrastructure equipment across multiple owners is sometimes used to create Mobile Virtual Network Operators (MVNOs). The teachings of the present patent disclosure are equally applicable to MVNOs as to PLMNs. Since each RAN, CN, or SN may be provided with its own network identifier (ID code), and further because of the numerous RAN-CN-SN combinations available in the network environment 100, traditional broadcasting of a single broadcast identifier for providing network advertisement information becomes unworkable.

Figure 2:
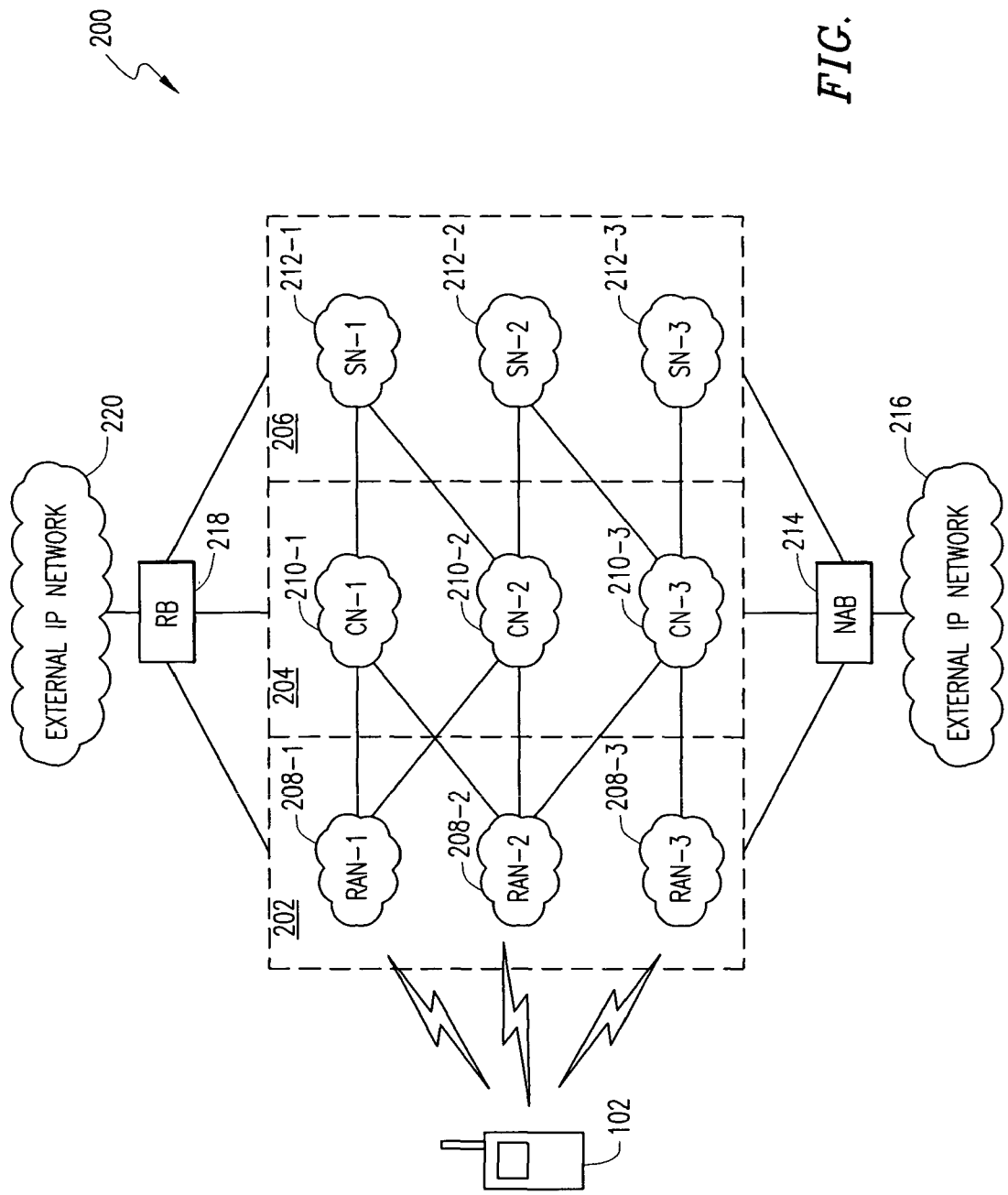
FIG. 2 depicts an exemplary embodiment of a network environment where a wireless user equipment (UE) device is operably disposed for acquiring network advertisement information in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, wireless UE device 102 is operably disposed for acquiring network advertisement information from a RAN segment 202 that is coupled to a CN segment 204 which in turn is coupled to an SN segment 206. Three RANs are illustrative: RAN-1 208-1, RAN-2 208-2 and RAN-3 208-3, which are identified with the network codes MANC1, MANC2 and MANC3, respectively. The CN segment 204 is also illustrated with three CNs: CN-1 210-1 (having an ID code of MCNC1), CN-2 210-2 (having an ID code of MCNC2) and CN-3 210-3 (having an ID code of MCNC3). Likewise, the SN segment 206 is illustrated with SN-1 212-1 (having an ID code of MSNC1), SN-2 212-2 (having an ID code of MSNC2) and SN-3 212-3 (having an ID code of MSNC3).

By way of example, RAN-1 208-1 is operable to support connectivity to two CNs, CN-1 210-1 and CN-2 210-2. In similar fashion, RAN-2 208-2 supports three CNs and RAN-3 208-3 supports only one CN. Each CN supports connectivity to one or more SNs: e.g., CN-3 210-3 connects to SN-2 212-2 as well as SN-3 212-3. Given the interconnectivity of the RAN/CN/SN segments, several combinations of identification codes may be obtained for purposes of uniquely identifying the various RAN-CN-SN combinations that the wireless UE device 102 can potentially discover and select from.

For instance, with a suitable Mobile Country Code (MCC) being included, the three ID code combinations associated with RAN-1 208-1 are:
[MCC.MANC1.MCNC1.MSNC1];
[MCC.MANC1.MCNC1.MSNC2]; and
[MCC.MANC1.MCNC2.MSNC2].

Likewise, the ID code combinations associated with RAN-2 208-2 are:
[MCC.MANC2.MCNC1.MSNC1];
[MCC.MANC2.MCNC1.MSNC2];
[MCC.MANC2.MCNC2.MSNC2];
[MCC.MANC2.MCNC3.MSNC2]; and
[MCC.MANC2.MCNC3.MSNC3].

The two ID code combinations associated with RAN-3 208-3 are: [MCC.MANC3.MCNC3.MSNC2] and [MCC.MANC3.MCNC3.MSNC2]. As will be described in detail hereinbelow, a number of options are available for providing the applicable network ID code information to the UE device 102 either in an initial scan procedure (i.e., when the device is not registered on any networks) or in a background scan procedure (i.e. when the device is registered on a network).

Further, a network advertisement broker (NAB) entity 214 is disposed in the network environment 200 that is operable as a depository of various RAN-CN-SN ID code combinations as well as information relating to supported services, capabilities, et cetera, on a network-by-network basis. For instance, a database structure associated with NAB 214 can contain RAN IDs, CN IDs to which each RAN is connected, services supported by each RAN, other access networks supported or operated by a RAN (i.e., which could be any radio technology such as 3GPP, 3GPP2, or any IEEE-based WLAN, as alluded to in the foregoing discussion), and the like, any or all of which information may be updated periodically or as needed. Additionally, depending on implementation, NAB 214 may be associated with a RAN, a CN, or an SN, or in any combination thereof. In a still further embodiment, NAB 214 may be provided as a third-party entity accessible via a public packet-switched Internet Protocol (IP) network portion 216, e.g., the Internet.

Another brokering entity 218, referred to as a roaming broker (RB), is also disposed in the network environment 200 for providing additional capabilities with respect to optimizing network selection by the UE device, particularly where roaming is involved. As will be seen in detail hereinbelow, one or more database structures associated with RB 218 may be provisioned with service relationship data and service status data pertaining to the networks that have direct or indirect visitor service arrangements with the UE device's home networks. Appropriate service logic provided at RB 218 may accordingly be executed for purposes of adapting network selection based on input forwarded by the UE device 102. Similar to the NAB implementation, RB 218 may be associated with a home network or a visited network, including a RAN, a CN, or an SN, or in any combination thereof. In a still further embodiment, RB 218 may be provided as a third-party entity accessible via a public packet-switched Internet Protocol (IP) network portion 220, e.g., the Internet.

Referring now to FIG. 3, depicted therein is an exemplary database structure 300 provided as part of a NAB entity in accordance with the teachings of the present patent disclosure. Based on the scope of coverage of the database as well as any third-party commercial arrangements, the database structure 300 may be provisioned with the data pertaining to a fairly large number of RANs. Reference numeral 302 refers to one or more RANs identified by their RAN ID codes. Services supported by each RAN are identified in column 304. For example, RAN-1 is operable to support High Speed Datalink Packet Access (HSDPA), EDGE, and the like. Cross-relationship or interoperability of a particular RAN with other access networks is indicated in column 306. As illustrated, RAN-1 interoperates with additional RANs, RAN-X, RAN-Y, and RAN-Z, as well as WLANs, WLAN-A and WLAN-C. Reference numeral 308 refers to the core networks supported by each particular RAN identified in column 302. Reference numeral 310 refers to the various services supported by each CN, such as, e.g., IP Multimedia Subsystem (IMS), Presence, Push-to-Talk over Cellular (PoC), and the like.

In accordance with the teachings of the present patent disclosure, at least three options are available for providing network advertisement information (i.e., information indicating which networks and network combinations are available to a wireless device):

Broadcast on a per RAN basis. In this option, existing broadcast messages may be expanded or additional broadcast messages be created to carry the combinations of network ID codes.

Broadcast all available networks and network combinations via a beacon channel which may be provided by a third-party, e.g., a public body, a consumer group, etc.

Provided via querying a NAB entity.

Figure 4:
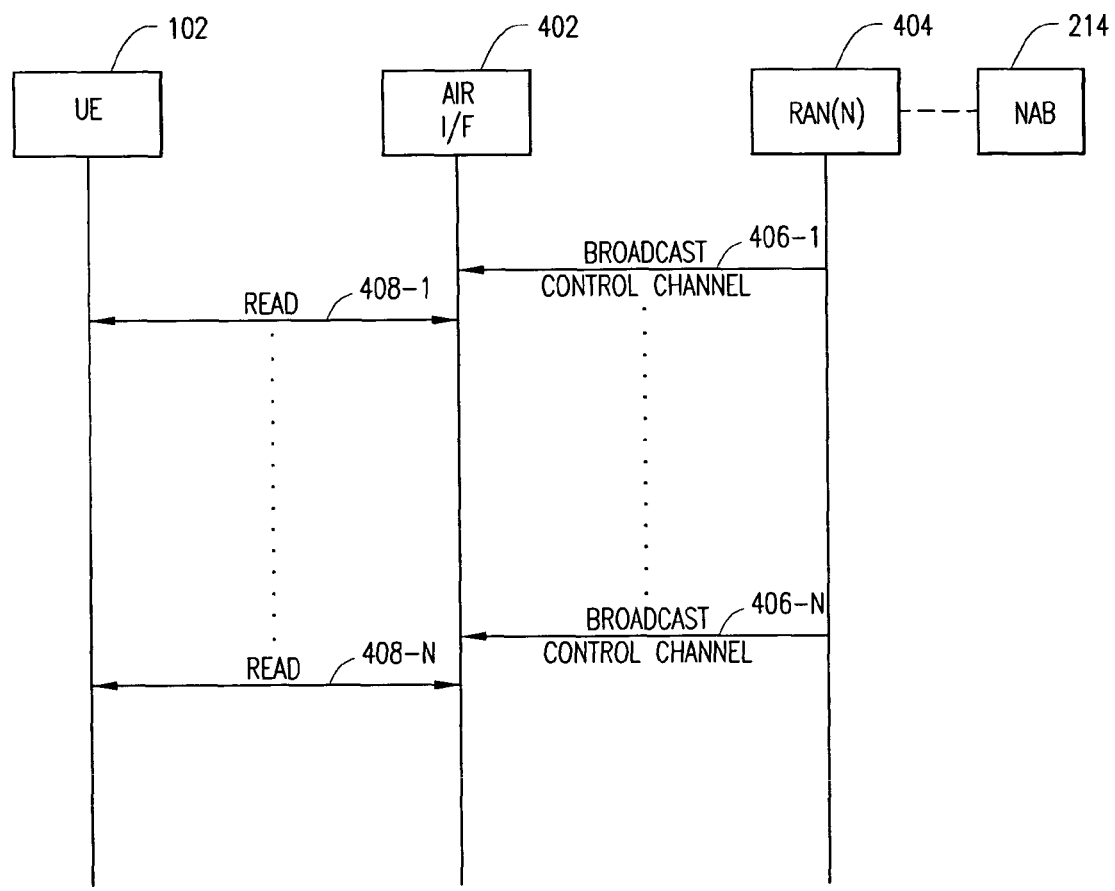
FIG. 4 depicts an exemplary message flow diagram of the present patent disclosure for acquiring network advertisement information according to one embodiment.

FIG. 4 depicts an exemplary message flow diagram of the present patent disclosure for acquiring network advertisement information according to one embodiment where advertisement messages are broadcast from RANs. One or more RANs 404 are operable to broadcast information via associated control channels over the air interface 402. In one arrangement, the RAN nodes 404 may comprise Base Transceiver Station (BTS) nodes deployed in various cellular networks. Reference numerals 406-1 through 406-N refer to the control channel messages that are broadcast by the network nodes at a designated repetition rate. In one implementation, the broadcast information may include network ID code combination information (i.e., identity information), capability information, adjacent cell information, among other types of information. UE 102 is operable to read the broadcast information over the air interface 402 and based at least in part upon the received advertisement information, appropriate network selection may be carried out which may be mediated through application of such preferences and prohibitions as may be configured by the subscriber, network operators, and the like.

In one implementation, the various RAN-CN-SN ID code combinations may be transmitted in their entirety. That is, each RAN-CN-SN ID code combination is completely resolved and transmitted explicitly. For example, each of the three combinations [MCC.MANC1.MCNC1.MSNC1]; [MCC.MANC1.MCNC1.MSNC2]; and [MCC.MANC1.MCNC2.MSNC2] provided in association with RAN-1 of FIG. 2 may be broadcast by RAN-1 in complete form. In another implementation, each CN may advertise all SN ID codes it supports. For instance, the [MCC.MANC1.MCNC1.MSNC1:MSNC2] combination format indicates that both MSNC1 and MSNC2 are supported by the CN identified by MCNC1.

As alluded to before, for each network there is a corresponding broadcast message that defines the services that are available. In one aspect, UE 102 can also request the services information by transmitting a particular ID code combination (e.g., [MCC.MANC1.MCNC1.MSNC2]) to the appropriate network node to obtain such information. Additionally, the ID code information as well as the services information may be provided to the individual RANs by one or more NABs for broadcasting.

Figure 5:
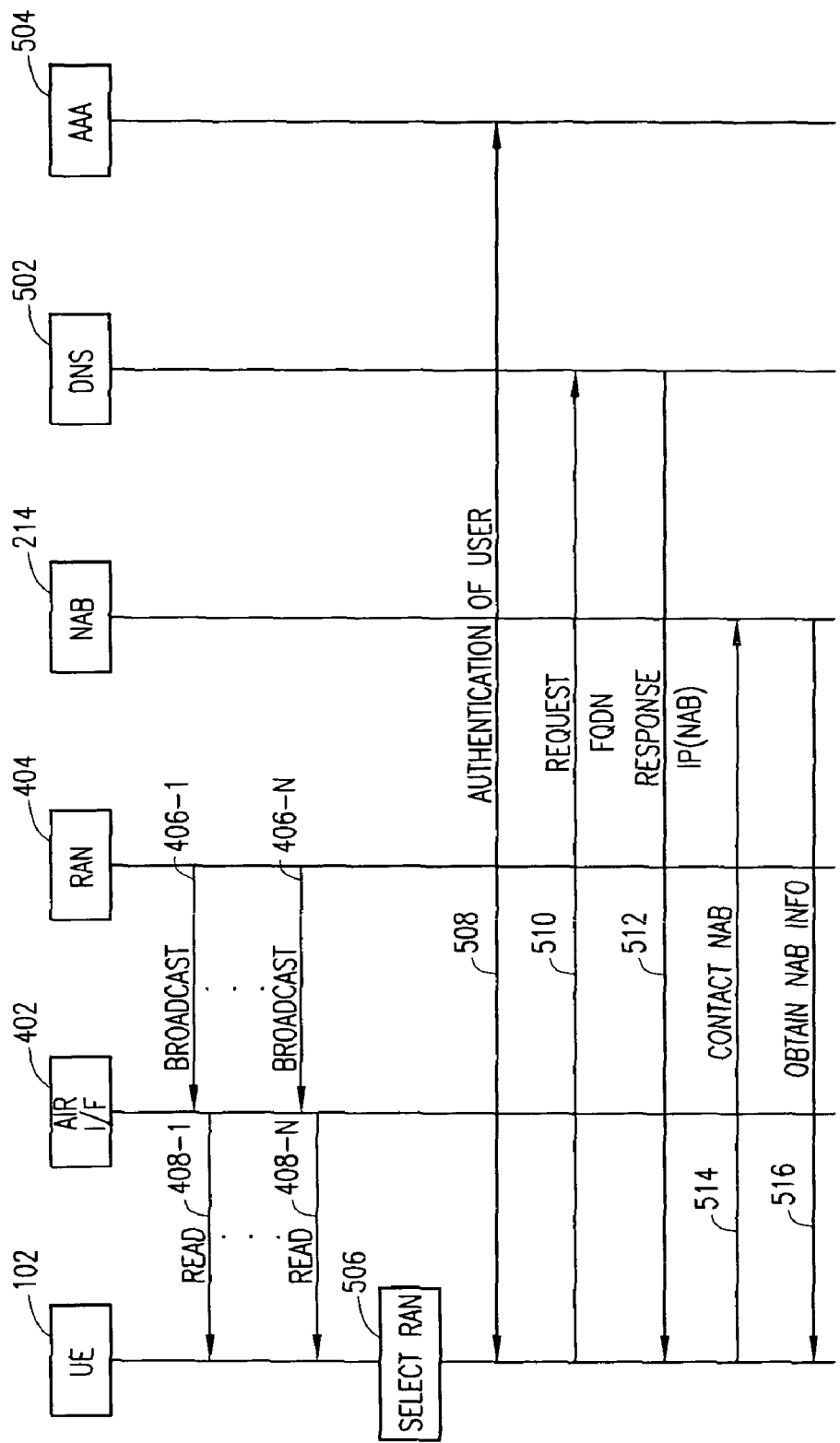
FIG. 5 depicts an exemplary message flow diagram of the present patent disclosure for acquiring network advertisement information according to another embodiment.

FIG. 5 depicts an exemplary message flow diagram of the present patent disclosure for acquiring network advertisement information according to another embodiment. As before, UE 102 is operable to read broadcast messages over the air interface 402 from the individual RANs. Using such applicable selection filters (e.g., positive filters (i.e., preferences) as well as negative filters (i.e., prohibitions)) as may be configured on the device, a particular RAN may be selected (block 506). Thereafter, the device/user is authenticated by engaging in an authentication mechanism 508 with an Authentication, Authorization and Accounting (AAA) server 504. Upon successful authentication, the RAN is operable to permit the device to contact a suitable NAB, e.g., NAB 214, using the NAB's IP address. In one implementation, the IP address may be obtained via a Fully Qualified Domain Name (FQDN) query initiated by the device, wherein the FQDN is constructed using the RAN's a Mobile Country Code (MCC) and Mobile Network Code (MNC). In another implementation, the AAA server 504 may provide the IP address or FQDN. Reference numerals 510 and 512 refer to a IP address request via FQDN query to a domain name server (DNS) 502 and the response therefrom. Once the NAB's IP address is available to UE device 102, it then contacts NAB 214 via a request message 514 and obtains the requisite NAB information via a reply 516. As part the request message 514, UE device 102 may include any or all of the following data: subscriber ID (e.g., International Mobile Subscriber Identity (IMSI) which is constructed as [MCC] [MNC] [MIN] in GSM, where [MCC] identifies the country that the subscriber is from, [MNC] identifies the PLMN network, and [MIN] is the unique ID that identifies the wireless UE device), network ID, (e.g., Cell Global Identification (CGI) or System Identification (SID)), network IDs of other networks, location information of the wireless UE device (e.g., Global Positioning System or GPS coordinates), media access control (MAC) addresses of available access points, and MAC address of the wireless UE device.

As part of the reply message 516, NAB 214 is operable to transmit the stored RAN-CN-SN ID information as well as the services and capabilities associated therewith. Based on the geographic location information of the wireless UE device, the NAB information may be appropriately customized. Upon receipt of the requisite information, the wireless UE device 102 may store it locally.

Figure 6:
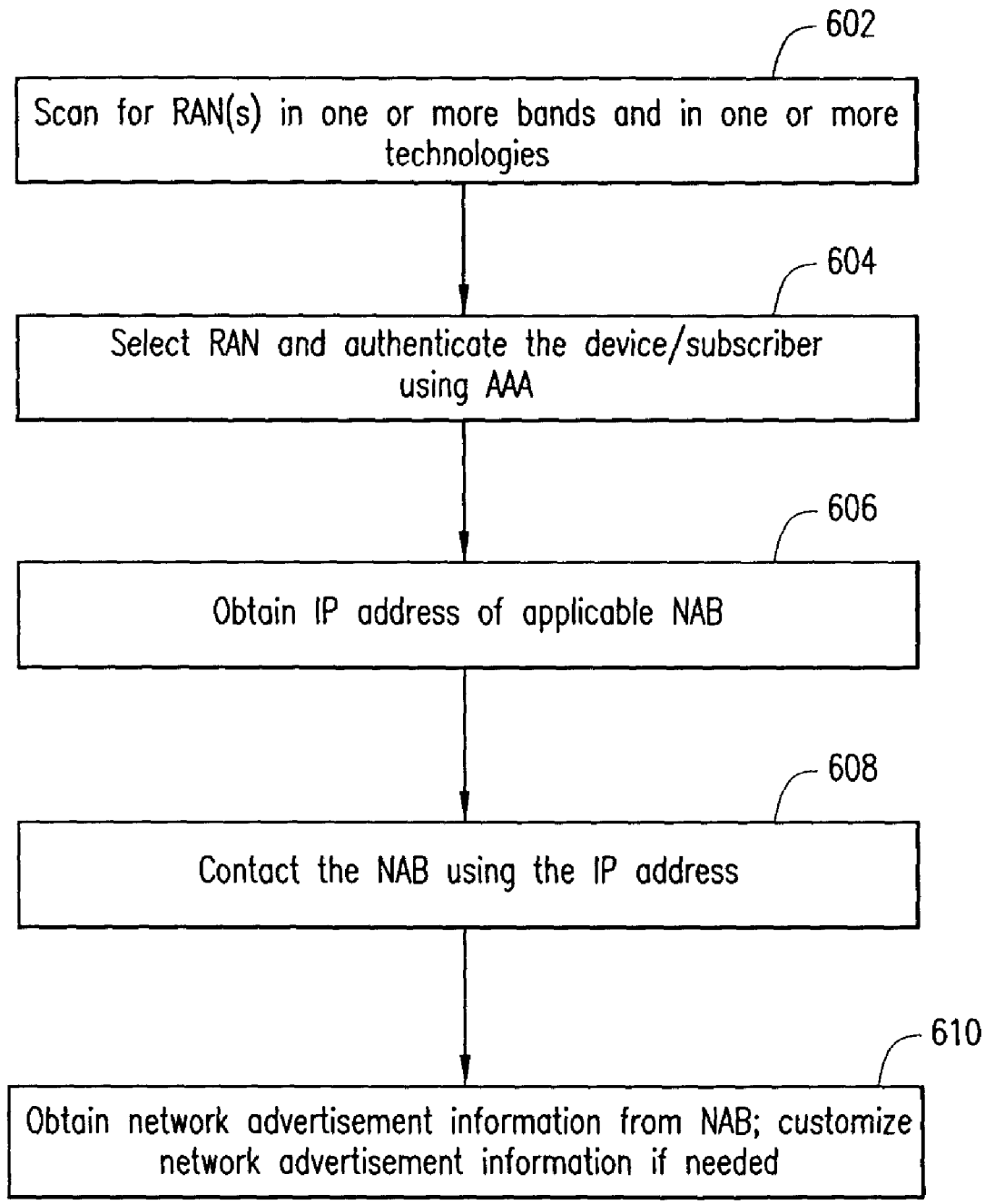
FIG. 6 is a flowchart associated with a method of the present patent disclosure.

FIG. 6 is a flowchart associated with an embodiment of the method described hereinabove. At block 602, the wireless UE device is operable to scan for available RANs including WLANs in one or more frequency bands and in one or more radio access technologies, depending on the device configuration, et cetera. For example, it is possible to configure the wireless UE device for a number of technology modes that are used, wherein the configuration information may be stored as an elementary file (EF) structure on a Subscriber Identity Module (SIM) card or Removable User Identity Module (RUIM) card operable with the device and/or as part of a managed object information tree. Other removable memory forms may include compact Flash, secure SD, et cetera. In another embodiment, such data could be stored in a fixed memory module integrated with the device. Additionally, the device configuration data may be modified by the network operator via an Over the Air (OTA) mechanism such as Short Message Service (SMS), Cell Broadcast, Multimedia Broadcast/Multicast Service (MBMS), or Unstructured Supplementary Service Data (USSD). In a still further embodiment, it may be possible for the subscriber to modify the device configuration data.

Given the diversity of the exemplary network environment 100 described earlier with respect to FIG. 1, it is envisaged that scanning may be effectuated in a frequency band in which at least one of the following technologies is operating: GERAN (without EDGE), GERAN (with EDGE), an IDEN network, a CDMA/CDMA2000/TDMA network, a UMTS network, and so on. Additionally, scanning may be effectuated in a frequency band compliant with a WLAN standard selected from: IEEE 802.11b standard, IEEE 802.11a standard, IEEE 802.11g standard, HiperLan standard, HiperLan II standard, Wi-Max standard, OpenAir standard, and Bluetooth standard. Further, the UE device includes logic for selecting a RAN based at least in part upon the network information obtained via scanning. Thereafter, an authentication mechanism using AAA is employed for authenticating the device and subscriber (block 604). The IP address of suitable NAB is obtained using, e.g., FQDN (block 606). Subsequently, the NAB is contacted using the IP address obtained in block 606, whereupon appropriate network advertisement information including services/capabilities information may be obtained from the NAB. As alluded to previously, such information may be customized based on the geographic location of the device, for example. These operations are illustrated in blocks 608 and 610.

FIG. 7 depicts an exemplary database structure 700 that may be provided as an operated-based list, a user-based list or an enterprise-based list, or any combination thereof, for configurably setting network selection preferences and prohibitions according to one aspect of the present patent disclosure. In one embodiment, the database structure 700 is configured as an operator-defined network list that specifies a plurality of network IDs which should be considered as preferred networks in one or more radio access technologies, wherein the network IDs are populated by the operator. In another embodiment, the database structure 700 may be configured as one or more user network lists, with one list per user using the wireless UE device, for example. Each such list may be accessed by the users upon identifying themselves to the device, wherein the contents of the list (i.e., network IDs) are populated by the respective users. In yet another embodiment, the database structure 700 may be configured as a list of network IDs that are preferred by an enterprise owning the wireless devices for the benefit of its employee-users.

Irrespective of the particular configuration, the database structure 700 defines a plurality of radio access technologies, e.g., EDGE technology 702A, WLAN technology 702B, and UMTS technology 702C, wherein a number of RAN IDs are provided for each technology. As illustrated in FIG. 7, column 704A identifies multiple RAN IDs for the EDGE technology, each RAN supporting one or more core networks identified in corresponding column 706A. Likewise columns 704B/706B and columns 704C/706C are provided for the WLAN and UMTS technologies respectively. As one skilled in the art may appreciate, the various IDs can be Service Set IDs (SSIDs) (for WLAN), SIDs (for IS-95 and IS-136), or [MCC, MNC] combinations (for GSM).

Similar to the network preference lists set forth above, an analogous database structure may be provided that identifies one or more networks that are forbidden for use. Such a list of prohibited networks may be configured as, for example, an operator-barred RAN list (i.e., specified by an operator), enterprise-barred RAN list (i.e., specified by an enterprise), operator-barred CN list (i.e., specified by an operator), and enterprise-barred CN list (i.e., specified by an enterprise).

In addition to one or more of the embodiments and configurations of the database structures identifying network preferences and prohibitions, one or more home network lists (including equivalent home networks) may be provided for facilitating network selection in conjunction with a network entity such as RB 218 (shown in FIG. 2). As is well known, each of the wide area cellular PLMNs may be arranged as a number of cells, with each cell having sectors (e.g., typically three 120-degree sectors per base station (BS) or cell). Each individual cell is provided with a CGI parameter to identify them. A group of cells is commonly designated as a Location Area (LA) and may be identified by an LA Identifier (LAI). At the macro level, the PLMNs may be identified in accordance with the underlying cellular technology. For example, as alluded to before, GSM-based PLMNs may be identified by an identifier comprised of a combination of MCC and MNC. The CDMA/TDMA-based PLMNs may be identified by a SID parameter and/or a Network Identification (NID) parameter. Regardless of the cellular infrastructure, all cells broadcast the macro level PLMN identifiers such that a wireless device (e.g., UE device 102) wishing to obtain service can identify the wireless network.

Additionally, a subscriber is also given a unique identifier which can vary depending on the underlying cellular infrastructure and may be constructed at least in part from some of the parametrics that are used in constructing the network identifiers. In GSM, for example, the subscriber's IMSI parameter is constructed as [MCC] [MNC][MIN].

For purposes of illustration, the embodiments of home network identifiers of the present patent disclosure will be particularly exemplified in reference to GSM networks, although it should be appreciated that the teachings set forth herein may be applied mutatis mutandis in other cellular networks as well. FIGS. 8A and 8B depict exemplary database structures which may be provided with a UE device for facilitating network selection in conjunction with an RB entity according to one embodiment. Reference numeral 800A refers to a basic database structure that comprises a list of [MCC] 802A and [MNC] 802B combinations that may be identified as being the same networks. In the case of equivalent networks, the [MCC] [MNC] combinations may identify a set of EHPLMNs for the IMSI associated with the subscriber. Reference numerals 804, 806 and 808 refer to three exemplary networks, wherein networks 804 and 806 share the same [MCC], i.e., [ABC], and networks 804 and 808 share the same [MNC] (i.e., [XYZ]). In one exemplary embodiment, the data structure 800A may be stored on a SIM/RUIM card of the device. In another embodiment, the data structure 800A could be stored in a fixed memory module integrated with the wireless UE device.

Reference numeral 800B refers to an enhanced database structure where additional information may be provided for facilitating network selection. A Master [MCC][MNC] column 820 identifies the [MCC] and [MNC] combinations that match the IMSI's [MCC]/[MNC] part (i.e., Master Home PLMN). A network name column 822 identifies the master network by name. A home network (EHPLMN) column 824 includes a list of home networks for each of the Master [MCC] [MNC] pairs. In one implementation, the [MCC] [MNC] combinations identifying the home networks may be provided in a priority order. For example, a positional priority may be implemented wherein an [MCC] [MNC] combination at the top has a higher priority over the one below it, or an [MCC] [MNC] combination to the left has a higher priority over the one to the right. An explicit priority ranking may also be provided wherein an indicator indicating the priority of the PLMN is appended to the database structure 800B. For instance, a value of [0] may indicate the highest priority. Where there is no priority indicator stored, all PLMNs have equal priority. An indicium column 825 is provided for uniquely identifying each PLMN listed in the home network list 824, wherein the indicium may comprise a unique identity name that can include some reference to the Master [MCC] [MNC] pair or the network name associated therewith. As before, the data structure 800B may be provided as part of a removable card or within a storage module integrated with the wireless UE device.

In one implementation, the wireless UE device is operable upon power-up to determine the capability of the SIM/RUIM card that has been inserted into it. If the wireless device discovers that the SIM/RUIM card contains a list of EHPLMNs, the device uses the list for subsequent network selection operations. If the SIM/RUIM card does not contain a list of PLMNs, the wireless device is operable to read the IMSI of the subscriber. Thereafter, if the wireless device is provided with stored home network lists in its memory for the [MCC] [MNC] pairs of the IMSI, the stored PLMN database may then be used to find the list of HPLMNs associated with a particular IMSI. Otherwise, the wireless UE device is operable to perform network scanning and discovery procedures as currently specified.

Given that there are a number of lists that could be used in the radio part, appropriate intelligence or logic may be provided as part of the wireless UE device in order to resolve priority among various radio access technologies, preferences and prohibitions. Where the wireless device is operable in multiple modes (i.e., different technologies), a particular mode may be designated as its primary operating mode (highest priority). Secondary and tertiary operating modes may be accorded lower priorities accordingly. Again, it is envisaged that the operating modes may be configured or reconfigured dynamically, based on operator-defined criteria, subscriber-defined criteria, or enterprise-defined criteria. Some exemplary parameters used in controlling the operating mode may be: device location information (e.g., GPS information), SSIDs, SIDs, [MCC,MNC] combinations, cell IDs, and the like. Additionally, certain override criteria may be provided for operators, enterprises or subscribers (i.e., for hard set). In one implementation, the interaction of these parameters defines when a particular technology takes either primary, secondary, or tertiary operating mode. Each defined parameter may be provisioned with a flag associated therewith, indicating whether the defined condition has to occur in order to set an operating mode. For example, consider that the wireless UE device discovers a specific cell ID upon performing an initial scan. It is assumed that the subscriber has defined the condition that if a home SSID is found in this cell, WLAN is to be set as the primary operating mode. Accordingly, the device's primary mode would be set to WLAN in this particular cell provided the home SSID has been found, and the secondary mode may be set to GSM.

In addition to the provisioning of various preferred and barred network lists (which can be device-centric, network-centric, or subscriber-centric), each country has its own regulatory requirements as to which list should take precedence. An enterprise company for instance may forbid access to a public WLAN access point that operates in the vicinity of the company's premises. Moreover, certain device logic may be necessary for specifying the scanning behavior as well, since there may be a number of bands on per-technology basis in which the device is capable of scanning. Additional details regarding list order prioritization and scanning procedures may be found in the following commonly owned co-pending U.S. patent application entitled "SYSTEM AND METHOD FOR PROVIDING NETWORK ADVERTISEMENT INFORMATION VIA A NETWORK ADVERTISEMENT BROKER (NAB)," filed Apr. 28, 2005 herewith Ser. No. 11/116,470 and cross-referenced hereinabove.

FIG. 9 depicts an exemplary database structure 900 provided as part of an RB node (e.g., RB 218 in FIG. 2) in accordance with the teachings of the present patent disclosure. Reference numeral 902 refers to a column of networks that have direct visitor relationships to one or more home networks (including equivalent home networks) defined for a wireless UE device and/or subscriber. In other words, the networks identified in column 902 are visited networks that provide roaming services to the home networks. As illustrated, these visited networks may comprise just the access networks (e.g., access networks identified as [MCCb.MANCc] and [MCCd.MANCa]) as well as network combinations that can include CNs and SNs. Column 904 identifies access networks having with relationships with the visited core networks identified in column 902. Column 906 provides status information with respect to indicating whether the identified radio/core network combinations are known to be operational. For instance, a service status flag such as "ON" or "OFF" may be provided to indicate if a particular network combination (e.g., a RAN/CN combination) is in service or not. Additionally, column 908 of the RB database structure provides services and capabilities supported on the visited networks that are identified in column 902.

Figure 10:
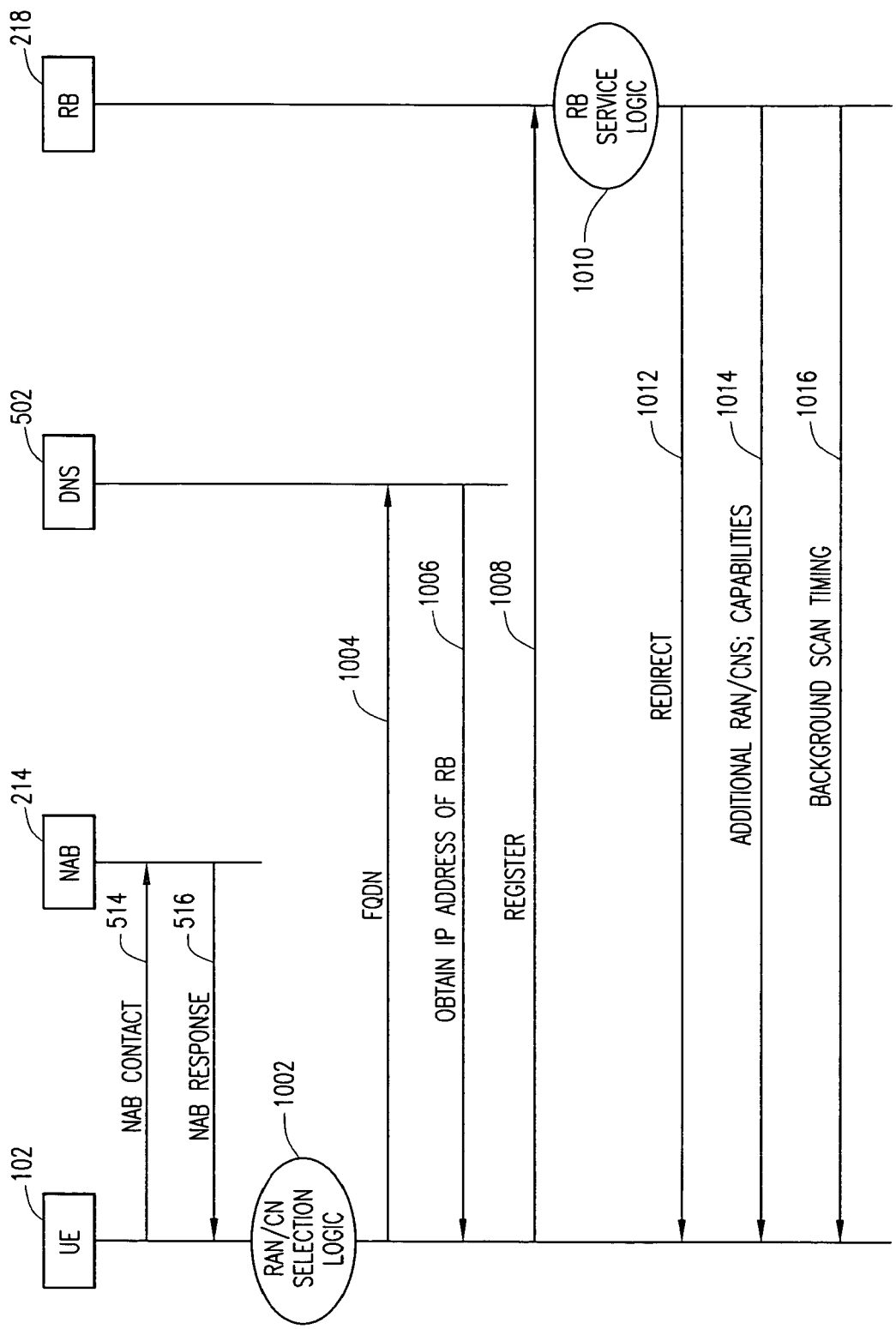
FIG. 10 depicts an exemplary message flow diagram of the present patent disclosure for interacting with an RB node according to one embodiment.

As set forth previously, various network preferences and barred lists (which may be embodied as the database structure 700 shown in FIG. 7) can be provisioned both in the device as well as in a network node in accordance with the teachings of the present disclosure for effectuating network selection. Provisioning of such lists in a wireless UE device facilitates initial discovery and selection of a particular network combination (i.e., a RAN/CN combination), whereupon the device may query a network entity such as the RB node that includes one or more network selection lists for additional information. FIG. 10 depicts an exemplary message flow diagram for interacting with an RB node according to one embodiment. Upon obtaining network advertisement information (either by monitoring broadcast control channels of individual RANs, or via a beacon channel, or by contacting NAB 214), UE 102 is operable to select a particular network combination in accordance with a preconfigured selection logic (block 1002). Thereafter, an FQDN query 1004 may be forwarded to DNS 502 in order to obtain an IP address of RB 218 via a response 1006. Alternatively, a previously cached IP address may be obtained for contacting RB 218. Additionally or alternatively, there may be a suitable AAA-based authentication mechanism in place similar to the UE-NAB interaction scheme described previously. Irrespective of how the IP address is obtained, UE 102 registers with RB 218 using a registration message 1008 which includes transmitting various pieces of information such as: identity information of the particular RAN/CN used for accessing RB 218, network advertisement information obtained from NAB 214, identity information and capability information of each network combination discovered by UE 102, location data of UE 102 (e.g., GPS coordinates), MAC) addresses of available WLAN access points or hot spots, MAC address and capabilities of UE 102, and services that UE 102 wants to use. Responsive to the received information from UE 102, appropriate service logic 1010 provided at RB 218 determines if the particular network combination initially selected by UE 102 at block 1002 is the optimal network. A redirect message 1012 may be generated by RB 218 toward UE 102, which includes identity information of a more suitable network combination if so determined. The redirect message 1012 may instruct the device to change access networks, core networks, etc. In addition, various pieces of capabilities information and additional network ID information may be transmitted by RB 218 which the device may want to use later. The RB may also signal back different background scan timers for each technology the wireless device supports. These actions are exemplified in FIG. 10 by way of signaling messages 1014 and 1016, respectively.

Figure 11:
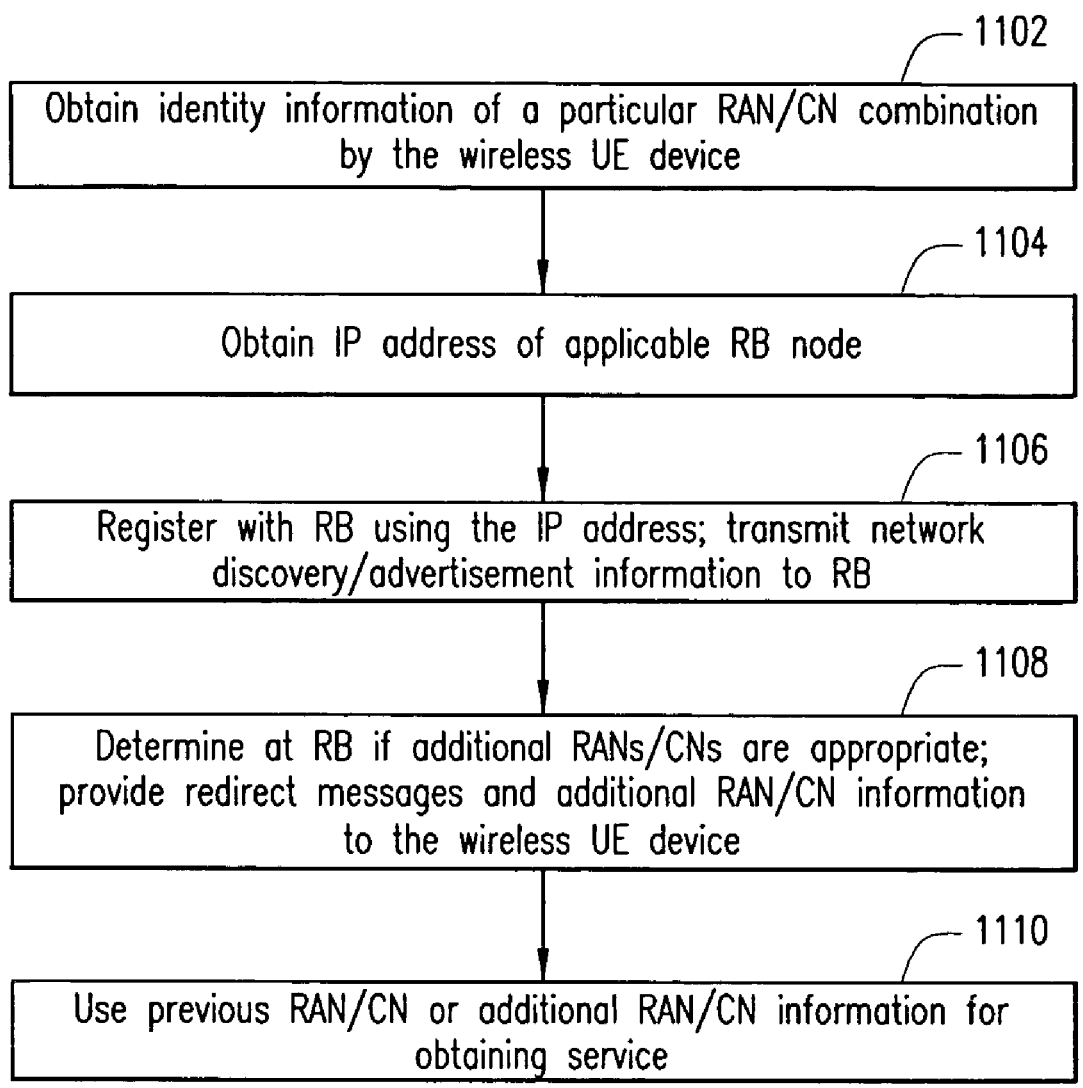
FIG. 11 is a flowchart associated with another method of the present patent disclosure.

Referring now to FIG. 11, shown therein is a flowchart associated with the method described above. At block 1102, identity information of a particular RAN/CN network combination is obtained by the wireless UE device. Thereafter, the IP address of applicable RB node is obtained (block 1104). Upon registration with the RB node using the IP address, network discovery and advertisement information is transmitted to the RB node (block 1106). As pointed out in the foregoing, various additional pieces of information may be transmitted also. A determination is made at the RB node if an additional network or a network combination is more suitable to the wireless device. Responsive to the determination, a redirect message including the additional network's ID information and/or network capability and services information is returned to the wireless device (block 1108). In one embodiment, the information provided by the RB node may be customized based on the wireless device's geographic location. Responsive to the received information, the wireless device employs appropriate logic to select the additional RAN/CN or the previous network combination for obtaining service (block 1110).

Figure 12:
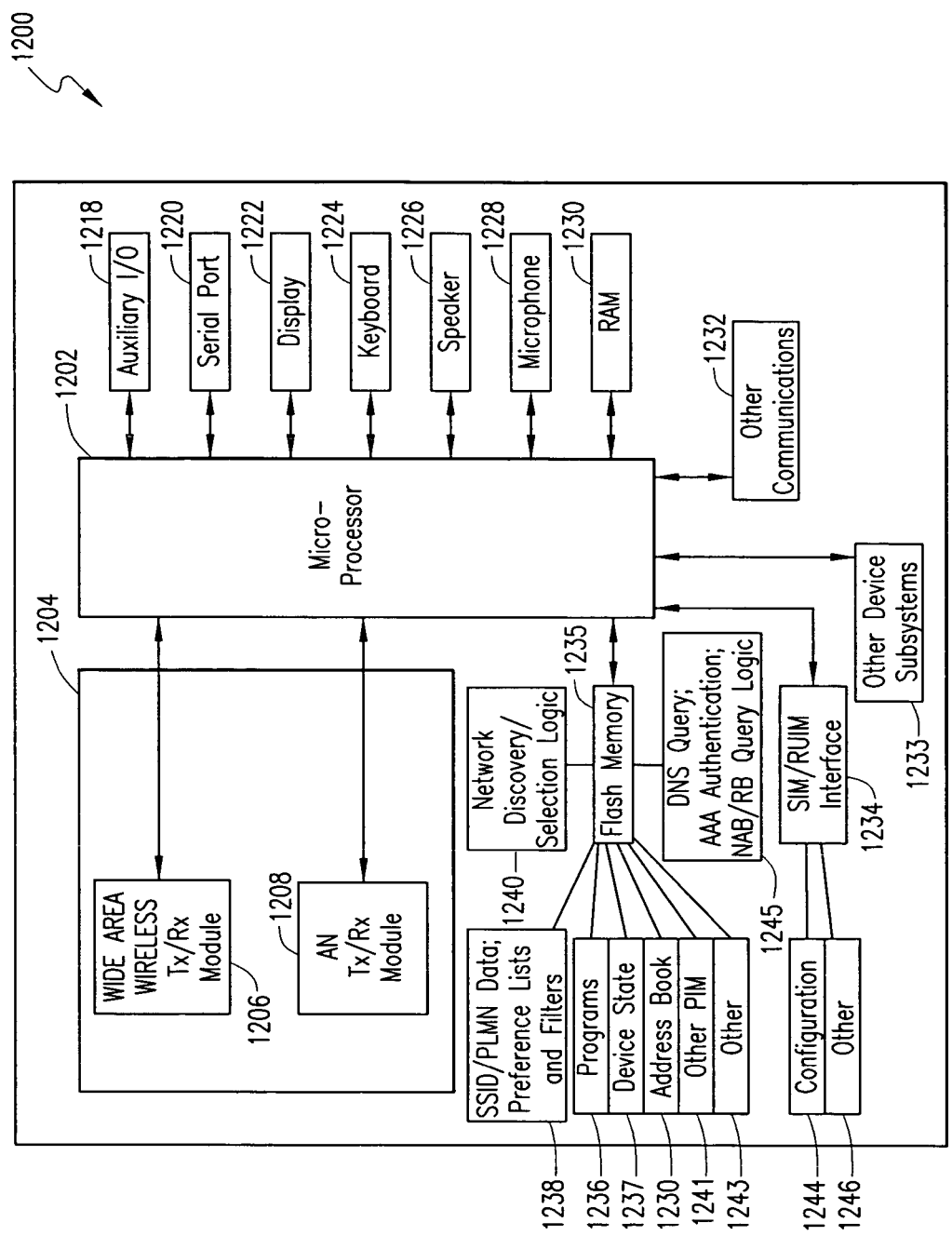
FIG. 12 depicts a block diagram of an embodiment of a wireless UE device operable to acquire network advertisement information and perform network selection according to the teachings of the present patent disclosure.

FIG. 12 depicts a block diagram of an embodiment of a wireless device 1200 operable to acquire network advertisement information and perform network selection according to the teachings of the present patent disclosure. It will be recognized by those skilled in the art upon reference hereto that although an embodiment of UE 102 may comprise an arrangement similar to one shown in FIG. 12, there can be a number of variations and modifications, in hardware, software or firmware, with respect to the various modules depicted. Accordingly, the arrangement of FIG. 12 should be taken as illustrative rather than limiting with respect to the embodiments of the present patent disclosure. A microprocessor 1202 providing for the overall control of UE 1200 is operably coupled to a communication subsystem 1204 which includes transmitter/receiver (transceiver) functionality for effectuating multi-mode communications over a plurality of bands. By way of example, a wide area wireless Tx/Rx module 1206 and a wireless AN Tx/Rx module 1208 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 1204 may be dependent upon the communications networks with which the UE device is intended to operate. In one embodiment, the communication subsystem 1204 is operable with both voice and data communications.

Microprocessor 1202 also interfaces with further device subsystems such as auxiliary input/output (I/O) 1218, serial port 1220, display 1222, keyboard 1224, speaker 1226, microphone 1228, random access memory (RAM) 1230, a short-range communications subsystem 1232, and any other device subsystems generally labeled as reference numeral 1233. To control access, a SIM/RUIM interface 1234 is also provided in communication with the microprocessor 1202. In one implementation, SIM/RUIM interface 1234 is operable with a SIM/RUIM card having a number of key configurations 1244 and other information 1246 such as identification and subscriber-related data as well as one or more SSID/PLMN lists and filters described in detail hereinabove.

Operating system software and other control software may be embodied in a persistent storage module (i.e., non-volatile storage) such as Flash memory 1235. In one implementation, Flash memory 1235 may be segregated into different areas, e.g., storage area for computer programs 1236 as well as data storage regions such as device state 1237, address book 1239, other personal information manager (PIM) data 1241, and other data storage areas generally labeled as reference numeral 1243. Additionally, appropriate network discovery/selection logic 1240 may be provided as part of the persistent storage for executing the various procedures, NAB information acquisition techniques, and network selection mechanisms set forth in the preceding sections. Logic for effectuating appropriate DNS queries, authentication, and NAB/RB queries is also exemplified as a logic module 1245. Associated therewith is a storage module 1238 for storing the SSID/PLMN lists, selection/scanning filters, capability indicators, et cetera, also described in detail hereinabove.

In view of the teachings set forth herein, the various logic blocks of UE device 1200 should be understood as comprising at least the following: a logic module operable to obtain identity information of a particular network combination available in a geographic location; a logic module operable to transmit network advertisement information to an RB node disposed in the network environment upon registration therewith; and a logic module operable to select one of the particular network combination and an additional network or network combination provided by the RB via a redirect message, wherein the RB includes service logic for determining if the additional network or network combination is more suitable to the wireless UE device 1200, the redirect message including identity information of the additional network/combination.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A network selection method operating at a wireless user equipment (UE) device, comprising:
    sending, to a broker node in a network that is wirelessly available, network advertisement information including identity information relating to a plurality of network combinations, each network combination comprising at least a radio access network (RAN) and one of a core network (CN) and a service network (SN) disposed in an interconnected arrangement;
    responsive to said sending, receiving a redirect message comprising identity information regarding an additional network combination for providing service with respect to said wireless UE device, wherein said additional network combination comprises at least a RAN and one of a CN and an SN that is determined to be better suited to said wireless UE device than said particular network combination initially selected by said wireless UE device and is customized based on the wireless UE device's location, based on querying a database having network relationship information defined for said wireless UE device; and
    receiving background scan timing information for use with each wireless technology supported by said wireless UE device.

2. The network selection method as recited in claim 1, wherein said network advertisement information comprises at least one of identity information and capability information associated with said particular network combination initially selected by said wireless UE device.

3. A network selection system operating in a wireless user equipment device, the system comprising:
    means, responsive to selecting a particular network combination, for sending network advertisement information including identity information relating to a plurality of network combinations to a broker node, each of said network combinations comprising at least a radio access network (RAN) and one of a core network (CN) and a service network (SN) disposed in an interconnected arrangement;
    means for receiving, from said broker node, an additional network combination comprising at least a RAN and one of a CN and an SN for providing service to said wireless UE device, wherein said additional network combination has been selected with regard to service relationship data that is provisioned on said broker node regarding RANs, CNs and SNs that have a relationship with a home network of said UE device and customized based on said wireless UE device's location;
    means for receiving background scan timing information for use with each wireless technology supported by the UE device; and
    means for choosing one of said particular network combination and said additional network combination;
    wherein each of said means is embodied in a persistent storage module of said UE device.

4. The network selection system as recited in claim 3, wherein said network advertisement information comprises at least one of identity information and capability information associated with said particular network combination initially selected by said wireless UE device.

5. A wireless user equipment (UE) device, comprising:
    a logic module operable to obtain identity information of a particular network combination available in a location area, said particular network combination selected from a plurality of network combinations, each combination comprising at least a radio access network (RAN) and one of a core network (CN) and a service network (SN) disposed in an interconnected arrangement;
    a logic module operable to transmit said identity information to a roaming broker (RB) disposed in said network environment upon registration therewith, said registration including transmission of an indication relating to particular services that said wireless device would like to use;
    a logic module operable to receive background scan timing information for use with each wireless technology supported by said UE device; and
    a network selection logic module operable to select one of said particular network combination and an additional network combination provided by said RB via a redirect message, said redirect message including identity information of said additional network combination, wherein said additional network combination is determined to be better suited to said wireless UE device, based on service relationship data regarding RANs, CNs and SNs that have a relationship with a home network of said UE device, than said particular network combination initially selected by said wireless UE device.

6. The wireless UE device as recited in claim 5, wherein said identity information of said particular network combination is obtained via scanning in at least one frequency band.

7. The wireless UE device as recited in claim 6, wherein said scanning is effectuated in a frequency band compliant with at least one of a General Packet Radio Service (GPRS) network, an Enhanced Data Rates for Global System for Mobile Communications (GSM) Evolution (EDGE) network, a 3$^{rd}$ Generation Partnership Project (3GPP)-compliant network, an Integrated Digital Enhanced Network (IDEN), a Code Division Multiple Access (CDMA) network, a Universal Mobile Telecommunications System (UMTS) network, and a Time Division Multiple Access (TDMA) network.

8. The wireless UE device as recited in claim 6, wherein said scanning is effectuated in a frequency band compliant with at least one of a Wireless Local Area Network (WLAN) standard selected from: IEEE 802.11 standard, HiperLan standard, HiperLan II standard, Wi-Max standard, OpenAir standard, and Bluetooth standard.

9. The wireless UE device as recited in claim 5, wherein said identity information of said particular network combination is obtained by querying a network advertisement broker (NAB) associated with at least one of a RAN, a CN, an SN, and a public packet-switched Internet Protocol (IP) network.

10. The wireless UE device as recited in claim 5, wherein said identity information of said particular network combination is obtained via a beacon channel available in said location area.

11. The wireless UE device as recited in claim 5, further comprising a logic module to transmit to said RB at least one of identity information and capability information associated with each network combination discovered by said wireless UE device.

12. A network selection method operating on a wireless user equipment device, comprising:
    obtaining identity information of a particular network combination selected from a plurality of network combinations, each comprising at least a radio network (RAN) and one of a core network (CN) and a service network (SN) disposed in an interconnected arrangement;
    registering with a roaming broker (RB), said registering including transmission of an indication relating to particular services that said wireless UE device would like to use;
    providing said identity information to said RB;
    selecting one of said particular network combination and an additional network combination received from said RB via a redirect message, wherein said additional network combination is determined to be better suited to said wireless UE device, based on querying a database having service relationship data regarding RANs, CNs and SNs that have a relationship with a home network of said UE device, than said particular network combination initially selected by said wireless UE device and is customized based on said wireless UE device's location; and
    receiving background scan timing information at said wireless UE device for use with each wireless technology supported by said UE device.

13. The network selection method as recited in claim 12, wherein said identity information is obtained via scanning in at least one frequency band.

14. The network selection method as recited in claim 12, wherein said registration comprises transmitting at least one of capability information and location information associated with said wireless UE device.

15. Software, embodied in a tangible, non-transitory storage module on a wireless user equipment device, that when executed facilitates network selection, said software comprising:
    logic for sending identity information relating to a plurality of network combinations discovered by said UE device, each network combination being identified as a combination of respective identification codes comprising at least a radio access network (RAN) and one of a core network (CN) and a service network (SN) disposed in an interconnected arrangement;
    logic for receiving a redirect message at said wireless UE device, said redirect message including identity information of an additional network combination, wherein said additional network combination comprises a RAN and one of a CN and an SN and is determined to be better suited to said wireless UE device than a network combination initially selected by said wireless UE device based on network relationship information for said wireless UE device and is customized based on said wireless UE device's location; and
    logic for receiving background scan timing information at said wireless UE device for use with each wireless technology supported by said UE device.

16. A wireless user equipment device comprising:
    means for sending network advertisement information to a roaming broker node in a network that is wirelessly accessible, said network advertisement information including identity information relating to a plurality of network combinations, each being identified as a combination of respective identification codes, said combination comprising at least a radio access network (RAN) and one of a core network (CN) and a service network (SN) disposed in an interconnected arrangement;
    means for receiving a redirect message from said roaming broker node, said redirect message including identity information of an additional network combination that comprises a RAN and one of a CN and an SN, is customized based on said wireless UE device's location and is determined to be better suited to said wireless UE device, with respect to service relationship data relating to RANs, CNs and SNs that have a service agreement with a home network associated with said wireless UE device, than a particular network combination initially selected by said wireless UE device, wherein each of said means comprises software embodied in a persistent storage module; and
    means for receiving background scan timing information at said wireless UE device for use with each wireless technology supported by the UE device.

17. The wireless UE device as recited in claim 5, wherein said network selection logic module selects said particular network combination.

18. The wireless UE device as recited in claim 5, wherein said network selection logic module selects said additional network combination.

* * * * *